(12) United States Patent
Giovangrandi et al.

(10) Patent No.: US 12,047,465 B1
(45) Date of Patent: Jul. 23, 2024

(54) OPTIMIZED DISCOVERY SYSTEM TO SUPPORT EMBEDDED WEBPAGES

(71) Applicant: Content Square SAS, Paris (FR)

(72) Inventors: Tristan Giovangrandi, Paris (FR); Nathaniel Zanzouri, Paris (FR); Xavier Coutin, Paris (FR); David Chamma, Paris (FR); Romain Bouic, Paris (FR); Cynthia Goh, Paris (FR); Alexandre Ilin, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 18/400,398

(22) Filed: Dec. 29, 2023

(51) Int. Cl.
*H04L 67/50* (2022.01)

(52) U.S. Cl.
CPC .................. *H04L 67/535* (2022.05)

(58) Field of Classification Search
CPC .................................. H04L 67/535
See application file for complete search history.

(56) References Cited

U.S. PATENT DOCUMENTS

| | | | | |
|---|---|---|---|---|
| 9,154,365 | B1 * | 10/2015 | Henry | H04L 69/329 |
| 2008/0082629 | A1 * | 4/2008 | Puthiyaveettil | G06F 16/954 709/217 |
| 2009/0044150 | A1 * | 2/2009 | Liu | G06F 16/957 715/854 |
| 2013/0304906 | A1 * | 11/2013 | Yavilevich | H04L 67/535 709/224 |
| 2023/0376320 | A1 * | 11/2023 | Meersma | G06F 9/451 |

\* cited by examiner

*Primary Examiner* — Gil H. Lee
(74) *Attorney, Agent, or Firm* — Schwegman Lundberg Woessner, P.A.

(57) ABSTRACT

A parent tag in a parent webpage displayed on a computing device sends a unique identifier to a child tag for each child page within the parent webpage and receives a response from a first child page. The parent tag generates a channel message comprising the unique identifier for the first child page and a recording status and sends the channel message to the first child page. The parent tag receives a content message from the first child page comprising activity data captured according to the recording status and comprising one or more actions performed by a user in the first child page. The parent tag sends the activity data comprising one or more actions performed by the user in the webpage and activity data comprising one or more actions performed by the user in the first child page to a server system to generate a session replay.

20 Claims, 11 Drawing Sheets

US 12,047,465 B1

OPTIMIZED DISCOVERY SYSTEM TO SUPPORT EMBEDDED WEBPAGES

BACKGROUND

The Internet is a collection of disparate computer systems which use a common protocol to communicate with each other. A common use of the Internet is to access websites. Websites are typically stored on a server and remotely accessed by a computing device over the Internet using a web browser.

To increase user visitations and revenue, web sites have become very sophisticated. Websites typically include webpages that provide information to users, advertise products or services to users and/or provide site search functions for users. A problem for website owners is how to determine how successful the website is, for example, whether the informational or other needs of users are met and whether the users are purchasing goods and services advertised on their site. Techniques have been developed for recording user activity (events such as URLs accessed and the like) on websites to generate event streams and analytics to determine the success of a website, among other things. Discovering important patterns, however, is very challenging.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

As explained above, techniques have been developed for recording user activity (events such as URLs accessed and the like) on websites to generate event streams and analytics to determine the success of a website, among other things. Many webpages, however, comprise elements that load another page, such as an HTML page, within the webpage. Some examples of these elements include an inline frame (iframe) or a WebView that comprises an HTML element that loads another HTML page within a document which essentially includes a child page in a parent webpage. Conventional techniques to record user activity do not record activity in the HTML page within the webpage and thus, much of the user activity is not captured, or what is captured may not make sense or be useful for discovering important patterns without the missing information.

Figure 5:
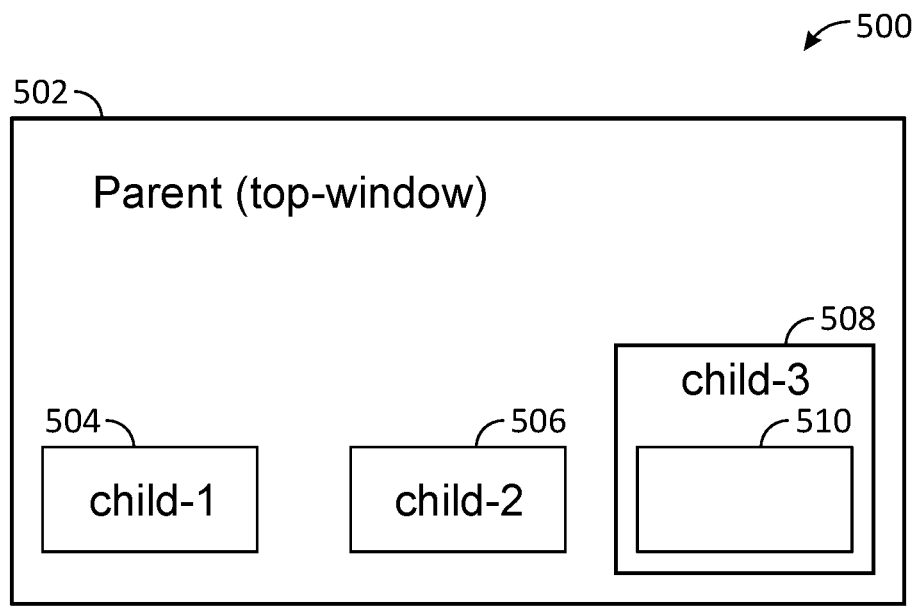
FIGS. 5-7 illustrate various examples of a parent tag in a parent webpage and one or more child pages, in accordance with some examples.

For example, a webpage (parent) 502 may have three child pages 504, 506 and 508 and one child page 510 within the child page 508, as shown in the example 500 of FIG. 5. A parent tag (e.g., a JavaScript code) in the parent 502 context cannot directly interact with each context in the child pages 504, 506, 508 and 510. The parent 502 cannot put a listener on a child page (to listen for a click event, for example) and the child page cannot access the parent tag. Embodiments described herein address these and other technical issues by establishing communication channels between a parent tag and a child tag in each child page to efficiently and accurately record user activity in both parent and child pages in a webpage, according to specified recording requirements. The specified recording requirements can include measures to ensure personal identifying information is kept private.

For example, as explained in further detail below, a parent tag (e.g., a tracking tag) in a parent webpage displayed on a computing device sends a unique identifier to a child tag for each child page within the parent webpage and receives a response from a first child page. The parent tag generates a channel message for the first child page. In one example, the channel message comprises the unique identifier for the first child page and a recording status. The parent tag sends the channel message to the first child page. The parent tag receives a content message from the first child page. In one example, the content message comprises the unique identifier for the first child page and activity data comprising one or more actions performed by a user in the first child page. The activity data is captured according to the recording status. The parent tag sends activity data comprising one or more actions performed by the user in the webpage and activity data comprising one or more actions performed by the user in the first child page to a server system to generate a session replay.

Networked Computing Environment

Figure 1:
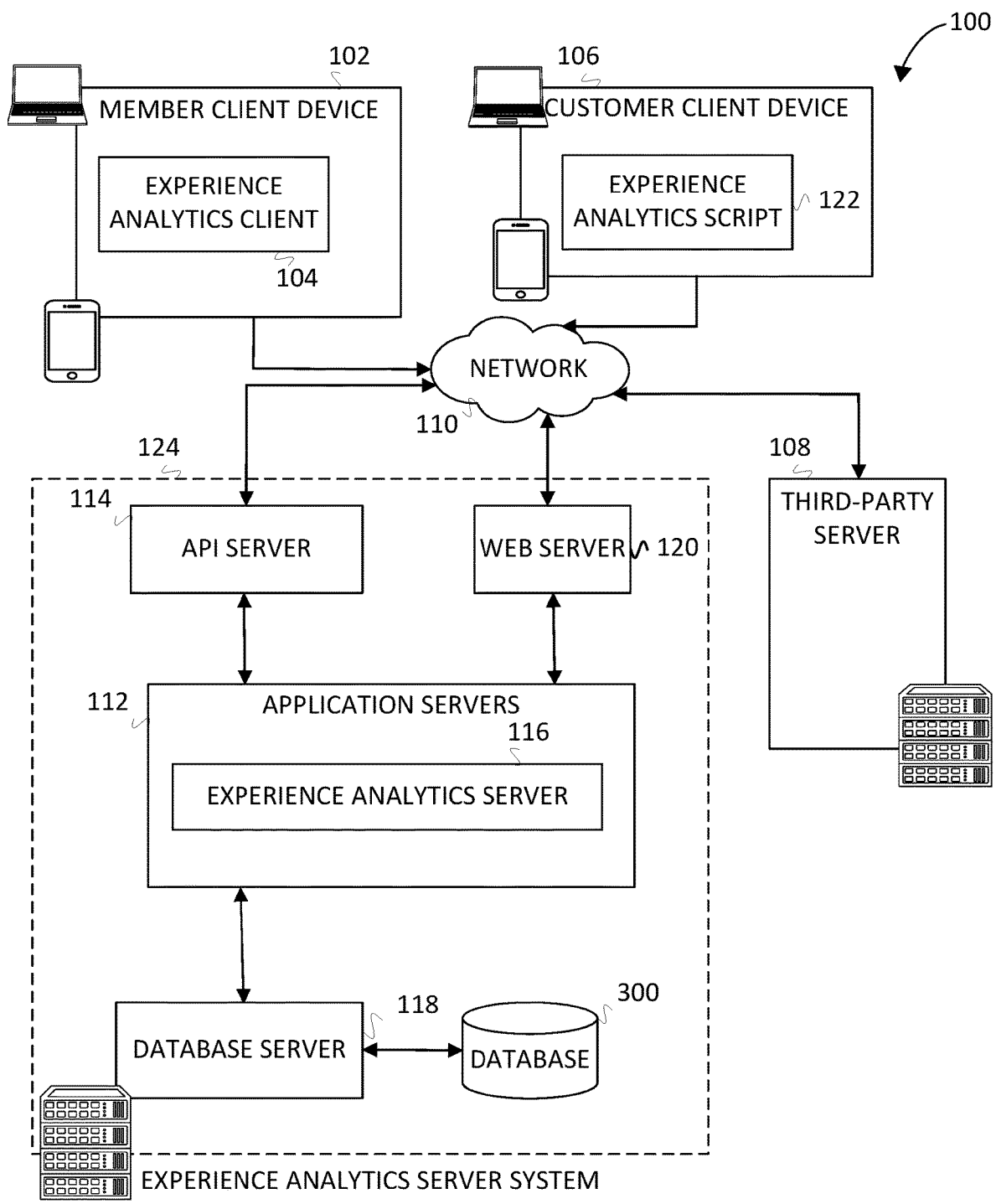
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a website, mobile websites, and applications. The experience analytics system 100 can include multiple instances of a member client device 102, multiple instances of a customer client device 106, and multiple instances of a third-party server 108.

The member client device 102 is associated with a client (also referred to herein as an "entity") of the experience analytics system 100, where the client has a website hosted on the client's third-party server 108. For example, the client can be a retail store that has an online retail website that is hosted on a third-party server 108. An agent of the client, such as a web master or an employee, can be the user of the member client device 102.

Each of the member client devices 102 hosts a number of applications, including an experience analytics client 104. Each experience analytics client 104 is communicatively coupled with an experience analytics server system 124 and third-party servers 108 via a network 110 (e.g., the Internet).

An experience analytics client 104 can also communicate with locally-hosted applications using Applications Program Interfaces (APIs).

The member client devices 102 and the customer client devices 106 can also host a number of applications including Internet browsing applications, such as Chrome or Safari. The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can navigate to a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server system 124. The SDK includes Application Programming Interfaces (APIs) with functions that can be called or invoked by the client's native application.

In one example, the experience analytics script 122 records data (also referred to here as "events") including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, and so forth. The experience analytics script 122 transmits the data to experience analytics server system 124 via the network 110. In another example, the experience analytics script 122 transmits the data to the third-party server 108 and the data can be transmitted from the third-party server 108 to the experience analytics server system 124 via the network 110.

An experience analytics client 104 is able to communicate and exchange data with the experience analytics server system 124 via the network 110. The data exchanged between the experience analytics client 104 and the experience analytics server system 124 includes functions, such as commands to invoke functions, as well as payload data, such as website data, texts reporting errors, insights, merchandising information, adaptability information, images, graphs providing visualizations of experience analytics, session replay videos, and zoning and overlays to be applied on the website.

The experience analytics server system 124 supports various services and operations that are provided to the experience analytics client 104. Such operations include transmitting data to and receiving data from the experience analytics client 104. Data exchanges to and from the experience analytics server system 124 are invoked and controlled through functions available via user interfaces (UIs) of the experience analytics client 104.

The experience analytics server system 124 provides server-side functionality via the network 110 to a particular experience analytics client 104. While certain functions of the experience analytics system 100 are described herein as being performed by either an experience analytics client 104 or by the experience analytics server system 124, the location of certain functionality either within the experience analytics client 104 or the experience analytics server system 124 may be a design choice. For example, it may be technically preferable to initially deploy certain technology and functionality within the experience analytics server system 124 but to later migrate this technology and functionality to the experience analytics client 104 where a member client device 102 has sufficient processing capacity.

Turning now specifically to the experience analytics server system 124, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112, and provides web-based interfaces to the application servers 112. To this end, the web server 120 processes incoming network requests over the Hypertext Transfer Protocol (HTTP) and several other related protocols.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program Interface (API) server 114 exposes to the experience analytics client 104 various functions supported by the application servers 112, including generating information on errors, insights, merchandising information, adaptability information, images, graphs providing visualizations of experience analytics, session replay videos, zoning, and overlays to be applied on the website, and so forth.

The application servers 112 host a number of server applications and subsystems, including, for example, an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, and so forth, received from multiple instances of the experience analytics script 122 on customer client devices 106. The experience analytics server 116 implements processing technologies and functions related to generating user interfaces including information on errors, insights, merchandising information, adaptability information, images, graphs providing visualizations of experience analytics, session replay videos, zoning, and overlays to be applied on the website, and so forth. Other processor and memory intensive processing of data may also be performed server-side by the experience analytics server 116, in view of the hardware requirements for such processing.

System Architecture

Figure 2:
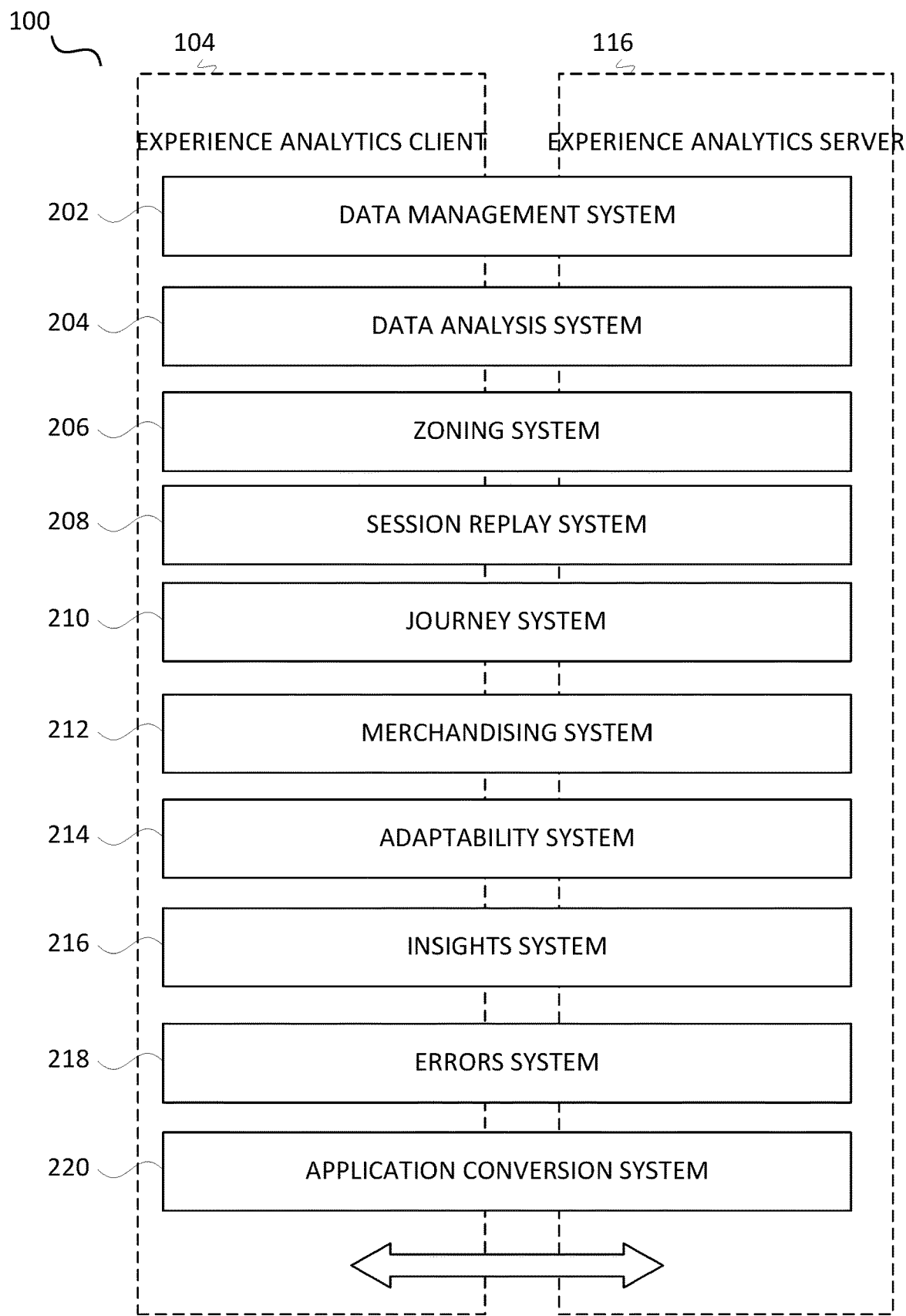
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element displayed on the web site (e.g., an icon, a text link). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual user's session (e.g., visitor session) on the client's website. The user's session starts when the user arrives into the client's website and ends upon the user's exit from the client's website. A user's session when visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter). The session replay interface allows the client via the member client device 102 to select and view each of the session replays. In one example, the session replay interface can also include an identification of events (e.g., failed conversions, angry customers, errors on the web site, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website and illustrates the visited pages and the order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on merchandise to be promoted on the website, optimization of sales performance, items in the client's product catalog on a granular level, competitor pricing, and the like. The merchandising interface can, for example, comprise graphical data visualization pertaining to product opportunities, category, brand performance, and so forth. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 106 for users that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 122 to determine whether an accessibility-enhanced version of the client's website is needed, and can generate the accessibility-enhanced version of the client's website to be displayed by the customer client device 106.

The insights system 216 is responsible for analyzing the data from the data management system 202 and the data analysis system 204 to surface insights that include opportunities as well as issues that are related to the client's website. The insights can also include alerts that notify the client of deviations from a client's normal business metrics. The insights can be displayed by the member client devices 102 via the experience analytics client 104 on a dashboard of a user interface, as a pop-up element, as a separate panel, and so forth. In this example, the insights system 216 is responsible for generating an insights interface to be displayed by the member client device 102 via the experience analytics client 104. In another example, the insights can be incorporated in another interface such as the zoning interface, the session replay, the journey interface, or the merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey on the website and the page that adversely affects (e.g., causes frustration for) the users on customer client devices 106 who are visiting the client's website. The errors can also include causes of looping behaviors by the users, in-page issues such as unresponsive calls to action and slow loading pages. The errors can be displayed by the member client devices 102 via the experience analytics client 104 on a dashboard of a user interface, as a pop-up element, as a separate panel, and the like. In this example, the errors system 218 is responsible for generating an errors interface to be displayed by the member client device 102 via the experience analytics client 104. In another example, the insights can be incorporated in another interface such as the zoning interface, the session replay, the journey interface, or the merchandising interface to be displayed by the member client device 102.

The application conversion system 220 is responsible for the conversion of the functionalities of the experience analytics server 116 as provided to a client's website or to a client's native mobile applications. For instance, the application conversion system 220 generates the mobile application version of the zoning interface, the session replay, the journey interface, the merchandising interface, the insights interface, and the errors interface to be displayed by the member client device 102 via the experience analytics client 104. The application conversion system 220 generates an accessibility-enhanced version of the client's mobile application to be displayed by the customer client devices 106.

Data Architecture

Figure 3:
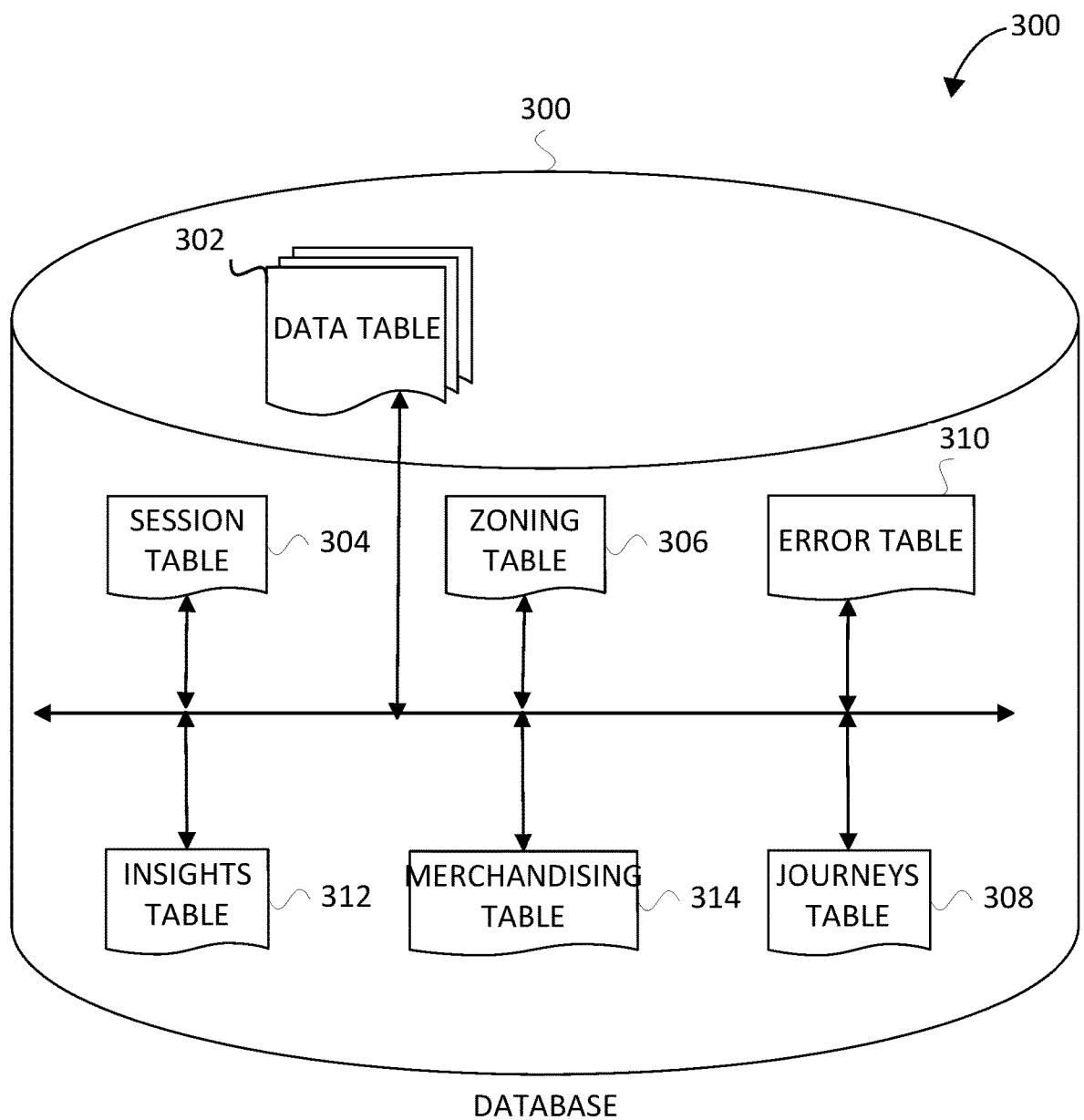
FIG. 3 is a diagrammatic representation of a data structure as maintained in a database, in accordance with some examples.

FIG. 3 is a schematic diagram illustrating database 300, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, and so forth. The data table 302 can also store data tags and results of data science and data engineering processes on the data. The data table 302 can also store information such as the font, the images, the videos, the native scripts in the website or applications, and so forth.

The session table 304 stores session replays for each of the client's websites and native applications.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights system 216.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities the performance of the products based on the zones in the website or application, and so forth.

Process

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, and so forth. The operations of methods may be performed in whole or in part, may be performed in conjunction with some or all of the operations in other methods, and may be performed by any number of different systems, such as the systems described herein, or any portion thereof, such as a processor included in any of the systems.

Figure 4:
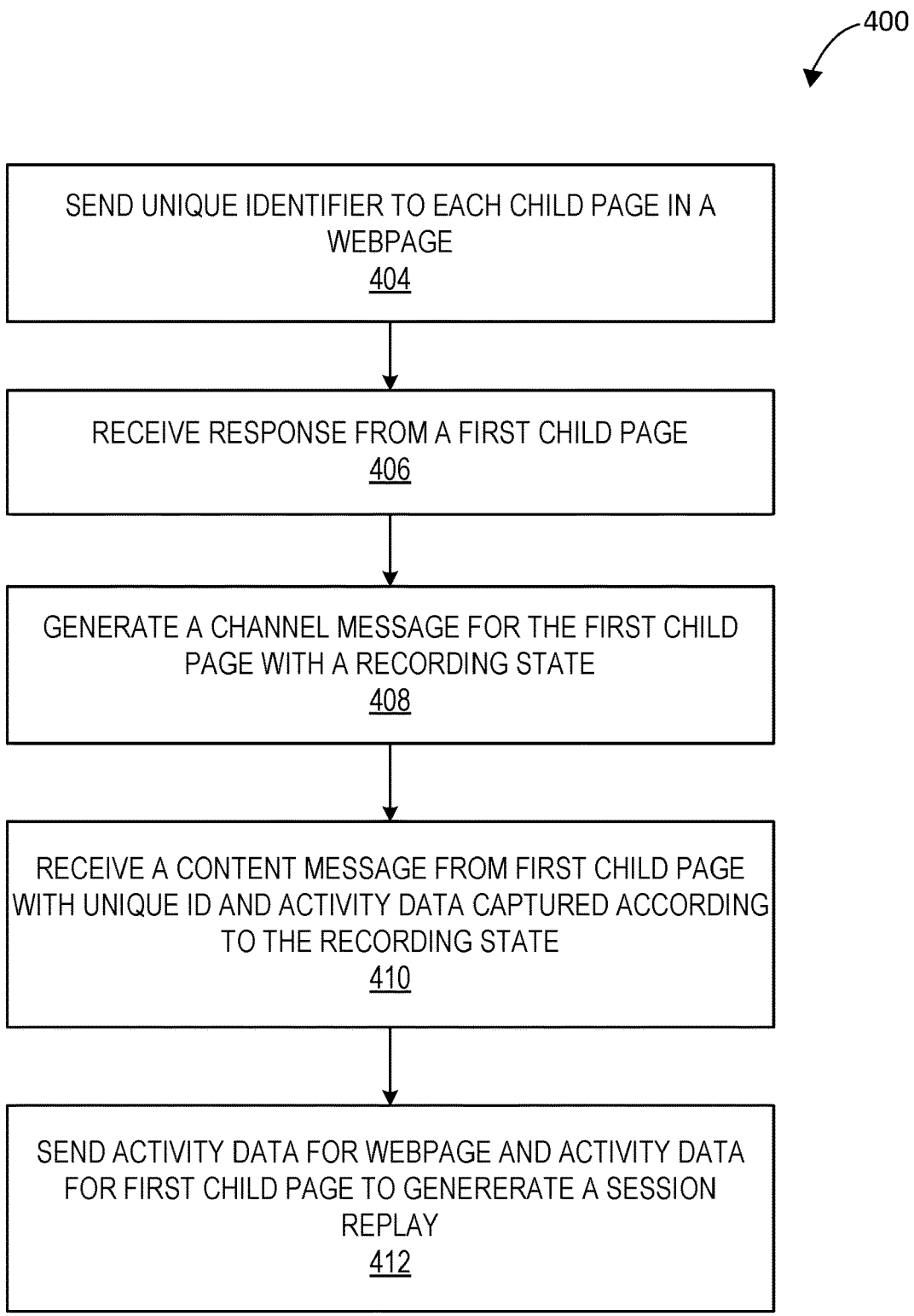
FIG. 4 is a flowchart for a process, in accordance with some examples.

FIG. 4 is a schematic diagram illustrating a process 400. A parent tag in a webpage displayed on a computing device (e.g., customer client device 106) determines one or more child pages in the webpage and sends a unique identifier to each child page (e.g., a child tag in each child page) in the webpage, in operation 404. In one example, the parent tag is a script, such as a JavaScript code, that can capture user actions and activity within a webpage, and each child page also contains a child tag that is a script similar to the parent tag. The parent tag sends a message (e.g., a discovery message) to each child tag with a unique identifier specific to the child page for that child tag. The unique identifier is used by the child tag to communication to the parent tag. Each child tag generates two message ports and sends one of their message ports with their respective unique identifier to the parent tag to initiate communication with the parent tag.

Figure 6:
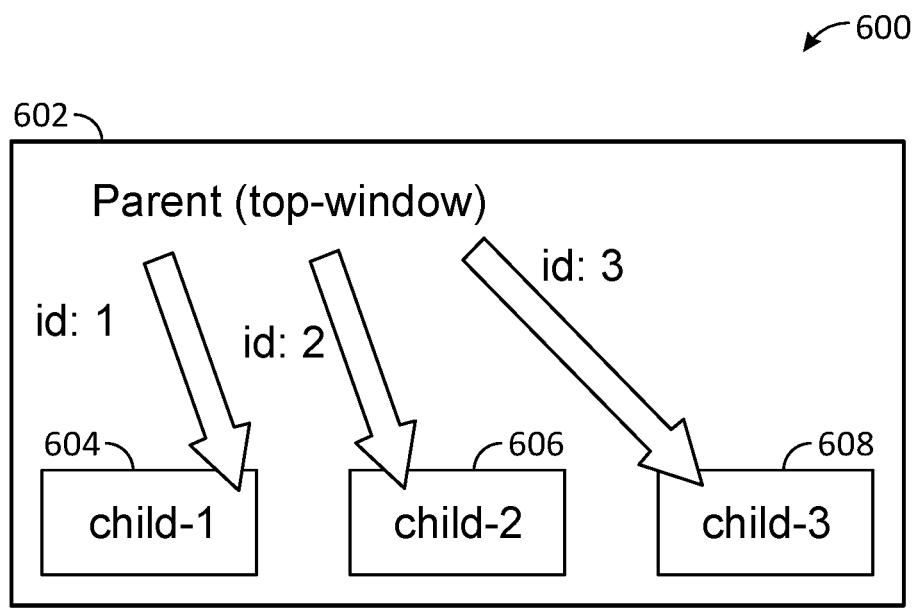
Figure 7:
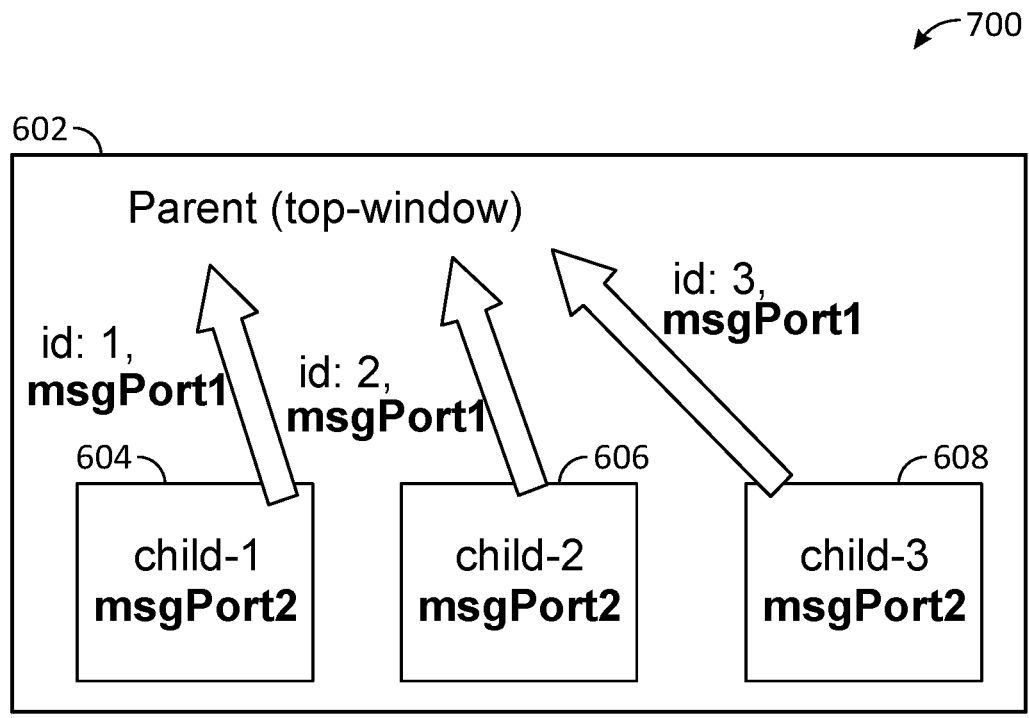

FIG. 6 illustrates an example 600 with a webpage 602 that has a parent tag and three child pages 604, 606, 608. In this example, the parent tag for webpage 602 sends a unique identifier (e.g., id 1) to a child tag in child page 604, a unique identifier (e.g., id 2) to a child tag in child page 606, and a unique identifier (e.g., id 3) to a child tag in child page 608. FIG. 7 illustrates an example 700 where each child page 604, 606 and 608 sends (e.g., via a respective child tag) a respective unique identifier and a message port (msgPort1) to the parent tag to initiate communication between each child tag and the parent tag. The message port is a dual channel communication object. Once the message port is sent to the parent, only the parent that is listening to this object can receive messages from a child page. This is beneficial because otherwise any script can intercept and process and child message which can slow down the entire website. For instance, because of the number of messages that can be sent between a parent and child (e.g., a "mouseMove" event alone can be more than 10 to 50 events per second), if all scripts had to receive and process messages, this would be a significant drain on computing resources and cause the website to slow significantly.

In one example, the parent tag keeps a map comprising message ports for each child associated with each respective unique identifier to use to send data to each child page. In one example, the parent tag adds a listener (e.g., a JavaScript event listener) to each child page message port to receive data from the respective child page. The parent tag receives a response from each child page that includes the respective unique identifier and the message port.

Returning to FIG. 4, in operation 406, the parent tag receives a response from a first child page. For example, the parent tag in the webpage 602 receives a response from a child tag for child page 604, as shown in FIG. 7 and described above. The parent tag can identify which child page sent the response based on the unique identifier sent in the response. Just one child page is used in this example, but it is to be understood that this process would occur for each child page.

In one example, the parent tag checks a message origin of the response message from the child page to confirm that the origin of the response message is one of predefined origins. For example, the parent tag checks the message origin of the response message against a list of approved origins to be sure that the response message is not from an unknown or malicious origin. In one example the parent tag may also check the project identifier (PID) and the signature to further ensure that the response message is from a legitimate child page. If the response message is not from an approved origin, the response message is ignored.

In operation 408, the parent tag generates a channel message for the first child page. In one example the channel message comprises the unique identifier for the first child page and a type for the message, such as a recording event or a recording status. Some examples of a recording event include a Document Object Model (DOM) event (mutation), such as, an added element, a removed element, a character data exchange, or any user event, such as a mouse move, a click, a scroll, and so forth. A recording status is a state of a recording, and all child pages will wait to receive a first recording status from a parent tag before recording activity data to be sure it has the correct instructions for any anonymization or masking of data for privacy. One example of a recording status is a recording field that will indicate whether a child tag should start recording or stop recording. In one example, a child tag cannot start recording user activity before the parent tag to ensure that it first receives any instructions for anonymizing or masking any personal identifiable information (PII). In this way, a child tag's recording state changes according to the parent recording state. For example, the parent tag can detect inactivity by the user and send a recording status to a child tag or the first child page instructing the child tag to stop recording activity data.

Other examples of a recording status include an anonymization field that will instruct each child page to replace certain textual content with a specified character (e.g., the letter "A") instead of the actual text, an anonymized element selector field that specifies certain elements that do not need to be anonymized, and a PII field that identifies elements that should be masked and not recorded. In each of these ways a child tag would enable recording with anonymization to obscure personal information associated with the user.

Another example of a recording status is a DOM mutation event field that specifies whether a child tag should send only user events, such as a click, scroll, and the like, but not sent any DOM mutation events. Yet another example of a recording status is an encryption selector field that includes a selector to identify an element to encrypt with a public key.

The parent tag sends the generated channel message to a child tag of the first child page and then the child tag of the child page can start recording activity data according to the recording status. In operation 410, the parent tag receives a content message from the first child tag. In one example, the content message comprises the unique identifier for the first child page and activity data comprising one or more actions performed by the user in the first child page where the activity data is captured according to the recording status. In one example, the content message further comprises a time stamp associated with the activity data.

In one example, the activity data comprises position data for one or more actions performed by the user within the first child page. The parent tag transforms this position data to a position within the webpage instead of a position with the first child page. For example, the parent tag transforms the position data to a position within the webpage by transforming an x and y coordinate of a position of an action performed by a user within the first child page to a corresponding x and y position in the webpage based on a position of the first child page within the webpage.

Figure 8:
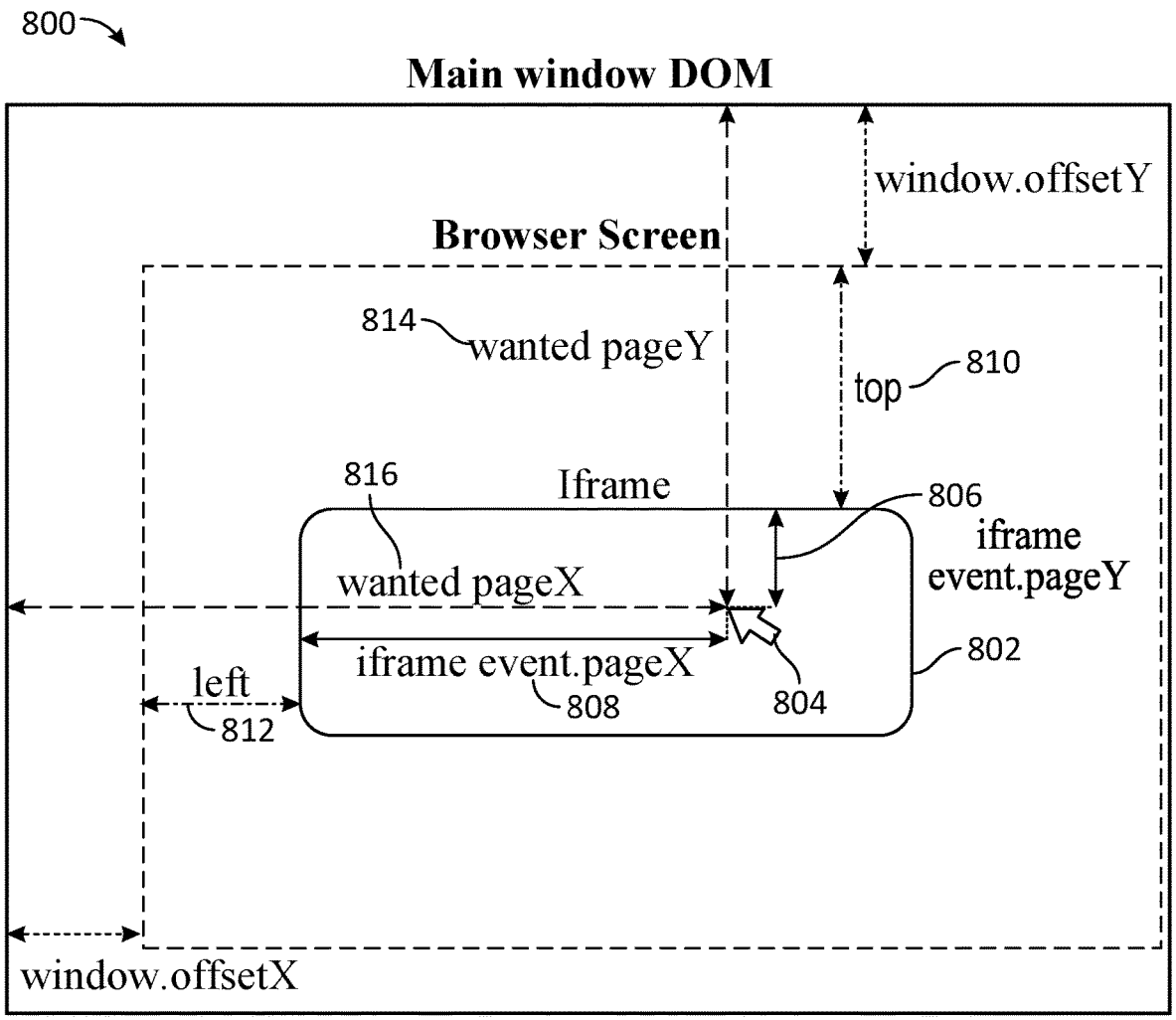
FIGS. 8-9 illustrate an example of transforming position data for an activity in a child page to a location within a parent page, in accordance with some examples.

FIG. 8 illustrates an example parent webpage 800 that comprises a child page 802 and illustrates a position of an activity 804 captured in a child page 802. In this example, position data sent by a child tag of child page 802 would include an x and y coordinate within the child page 802 represented by the location 808 (iframe event.pageX) and location 806 (iframe event.pageY) within the child page 802. The parent tag will recompute the x and y position represented by the position data to represent the position from the parent webpage 800 point of view. This would also apply for any further nested child page (e.g., a second child page within a first child page).

Figure 9:
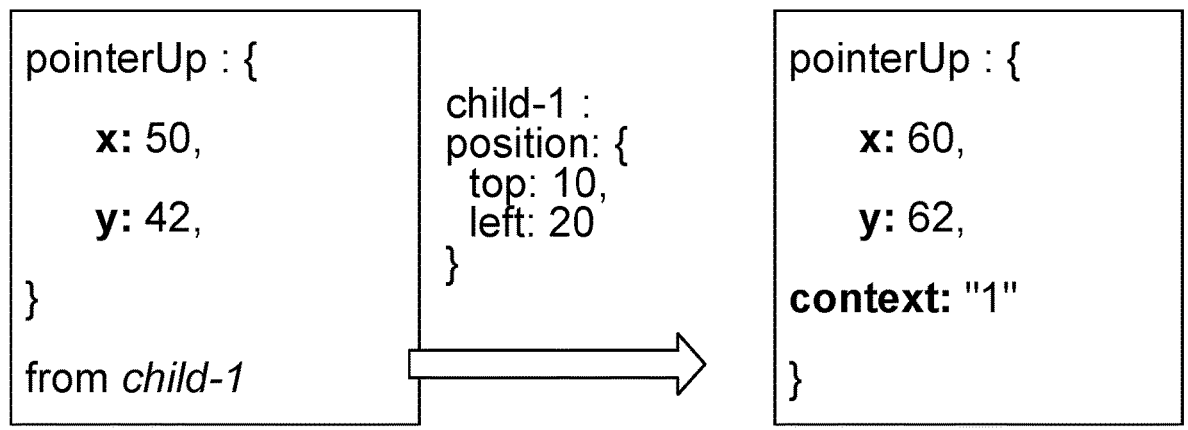

To recompute the x and y position data represented by the position data to represent the position from the parent webpage 800 point of view, the parent tag takes the x and y position of the activity 804 and adds the top position 810 and left position 812 of the child page 802 within the parent webpage 800 to get the x and y position within the parent webpage 800 represented by wanted page Y 814 and wanted page X 816. FIG. 9 illustrates an example where the x position is 50 and the y position is 42 within the child page 802 and the child top position is 10 and the child left position is 20. In this example, the parent tag of the parent webpage 800 add the top position 10 to the x position 50 and the left position 20 to the y position 42 of the child page 802 to get the x position 60 and the y position 62 within the parent webpage 800.

Returning to FIG. 4, in operation 412, the parent tag sends activity data comprising one or more actions performed by the user in a parent page of the webpage and activity data comprising one or more actions performed by the user in the first child page of the webpage to a server system to generate a session replay. In one example, the parent tag sends the activity data to the server system upon receipt. In other examples, the parent tag batches activity data and sends the batched activity data to the server system after a predefined period of time or a predefined amount of activity data is collected. The server system generates the session replay by assembling the activity data according to a time stamp associated with the activity data and causes the one or more actions performed by the user on the webpage and the first child page to be replayed on a computing device.

In one example, a new child page can be added or instantiated in the parent page. In this case, a child tag in the new child page sends a discovery message to the parent tag to request a unique identifier from the parent tag. The parent tag receives the discovery message from the new child page and sends the unique identifier the child tag for the new child, as explained above. The new child tag can then start recording activity data based on a recording status provided by the parent tag, as also explained above. The new child tag can send to the parent tag a content message comprising the unique identifier for the new child page and activity data comprising one or more actions performed by the user in the new child page that is captured according to the recording status. When the parent tag sends activity data to the server system to generate the session replay, the parent tag will also send the activity data from the new child page to generate the session replay.

In one example, a child page can be a nested child page where, for example, a second child page is nested within a first child page. In this example, the first child page can send a message with a unique identifier to the second child page to establish a communication channel, as explained above. Also, the second child page can send a message to the first child page to request a unique identifier, as also explained above. The second child page can send a content message to the first child page and the first child page can send the content message to the parent tag.

The above description relates to handling a child page that can be in the form of an iframe or similar type of child page. It is to be understood that the above description also applies to a WebView type of child page. For example, an application that is a hybrid application can include a native SDK and functionality to allow for a WebView. A native SDK tracker can be included in the hybrid application that has the parent tag role for sending data and managing a session, and a child tag can be used in a WebView. The functionality of the parent tag and child tag for a WebView is that same as what is described above for an iframe except that the child tag in the WebView is in communication with the SDK tracker that is acting as the parent tag role in the hybrid application. Further, with an iframe a web API (e.g., channel messaging and postMessage) is used and with a WebView a JavaScript bridge is used to send data to the SDK tracker. The JavaScript bridge is an object in a Web context that allows the native SDK to view data put to this object, and thus is used for communication between the child tag and the SDK tracker. For instance, the child tag can put messages to the Javascript bridge and the SDK tracker can view the messages vis the JavaScript bridge.

Machine Architecture

Figure 10:
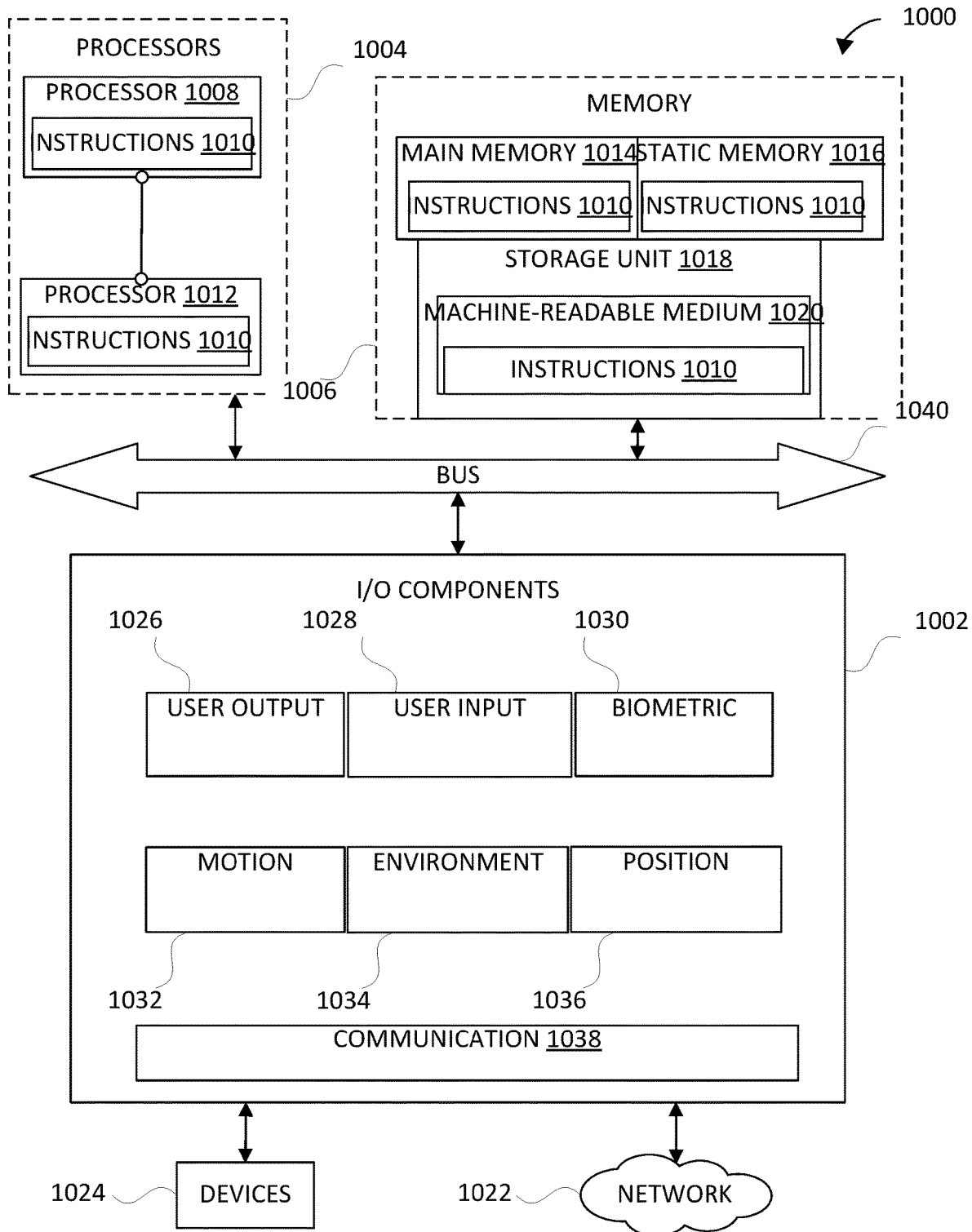
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of a machine 1000 within which instructions 1010 (e.g., software, a program, an application, an applet, an application, or other executable code) for causing the machine 1000 to perform any one or more of the methodologies discussed herein may be executed. For example, the instructions 1010 may cause the machine 1000 to execute any one or more of the methods described herein. The instructions 1010 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the instructions 1010 to perform any one or more of the methodologies discussed herein. The machine 1000, for example, may comprise the member client device 102 or any one of a number of server devices forming part of the experience analytics server 116. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1002, which may be configured to communicate with each other via a bus 1040. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1008 and a processor 1012 that execute the instructions 1010. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1014, a static memory 1016, and a storage unit 1018, both accessible to the processors 1004 via the bus 1040. The main memory 1006, the static memory 1016, and storage unit 1018 store the instructions 1010 embodying any one or more of the methodologies or functions described herein. The instructions 1010 may also reside, completely or partially, within the main memory 1014, within the static memory 1016, within machine-readable medium 1020 within the storage unit 1018, within at least one of the processors 1004 (e.g., within the processor's cache memory), or any suitable combination thereof, during execution thereof by the machine 1000.

The I/O components 1002 may include a wide variety of components to receive input, provide output, produce output, transmit information, exchange information, capture measurements, and so on. The specific I/O components 1002 that are included in a particular machine will depend on the type of machine. For example, portable machines such as mobile phones may include a touch input device or other such input mechanisms, while a headless server machine will likely not include such a touch input device. It will be appreciated that the I/O components 1002 may include many other components that are not shown in FIG. 10. In various examples, the I/O components 1002 may include user output components 1026 and user input components 1028. The user output components 1026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1002 may include biometric components 1030, motion components 1032, environmental components 1034, or position components 1036, among a wide array of other components. For example, the biometric components 1030 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1032 include acceleration sensor components (e.g., accelerometer), gravitation sensor components, rotation sensor components (e.g., gyroscope).

The environmental components 1034 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 360° camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera and a depth sensor, for example.

The position components 1036 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1002 further include communication components 1038 operable to couple the machine 1000 to a network 1022 or devices 1024 via respective coupling or connections. For example, the communication components 1038 may include a network interface component or another suitable device to interface with the network 1022. In further examples, the communication components 1038 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1024 may be another machine or any of a wide variety of peripheral devices (e.g., a peripheral device coupled via a USB).

Moreover, the communication components 1038 may detect identifiers or include components operable to detect identifiers. For example, the communication components 1038 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1038, such as location via Internet Protocol (IP) geolocation, location via Wi-Fi® signal triangulation, location via detecting an NFC beacon signal that may indicate a particular location, and so forth.

The various memories (e.g., main memory 1014, static memory 1016, and memory of the processors 1004) and storage unit 1018 may store one or more sets of instructions and data structures (e.g., software) embodying or used by any one or more of the methodologies or functions described herein. These instructions (e.g., the instructions 1010), when executed by processors 1004, cause various operations to implement the disclosed examples.

The instructions 1010 may be transmitted or received over the network 1022, using a transmission medium, via a network interface device (e.g., a network interface component included in the communication components 1038) and using any one of several well-known transfer protocols (e.g., hypertext transfer protocol (HTTP)). Similarly, the instructions 1010 may be transmitted or received using a transmission medium via a coupling (e.g., a peer-to-peer coupling) to the devices 1024.

Software Architecture

Figure 11:
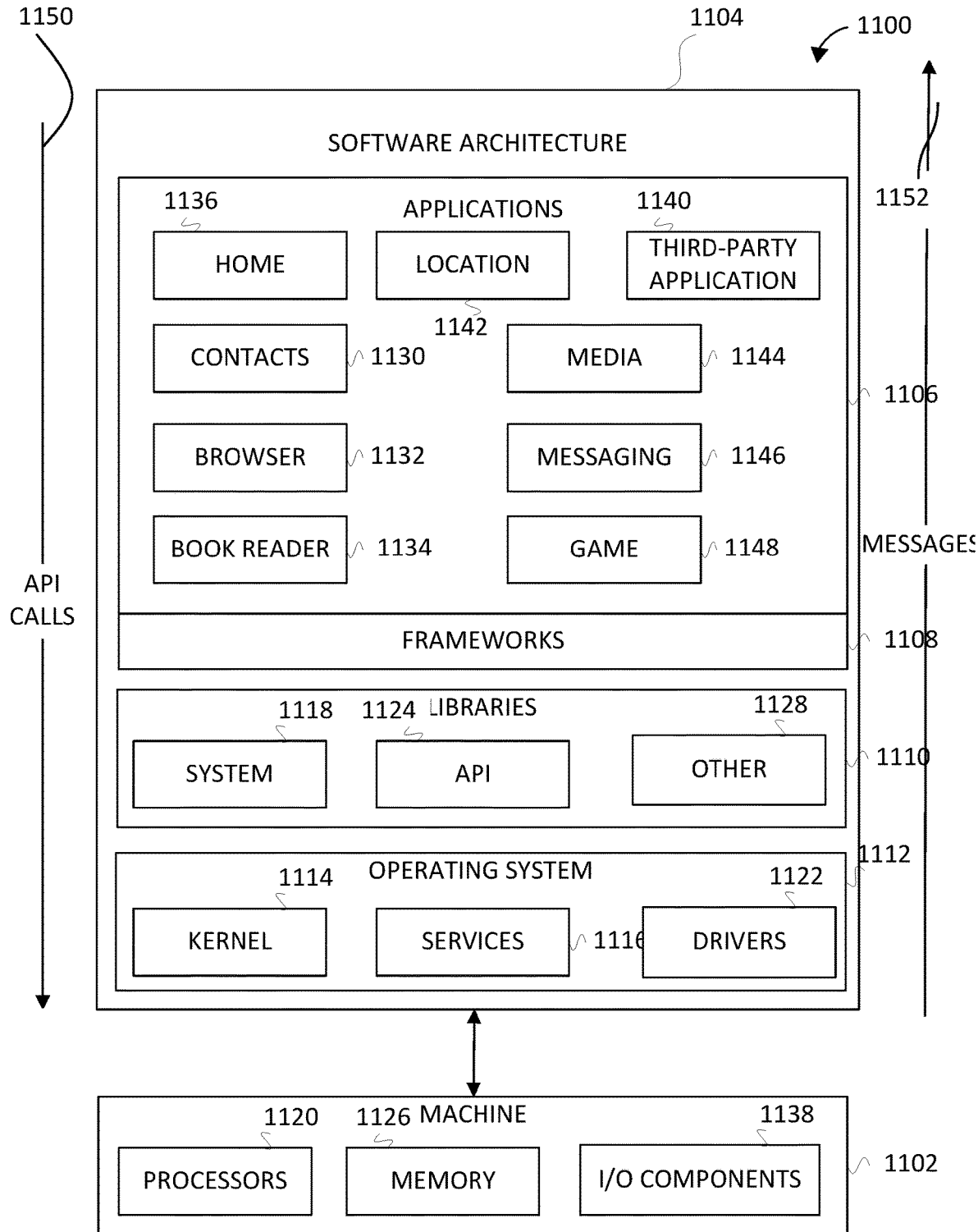
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionalities. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 606 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1140 can invoke the API calls 1150 provided by the operating system 1112 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A computer-implemented method, comprising:
   sending a unique identifier to each child page within a webpage;
   receiving a response from a first child page;
   generating a channel message for the first child page, the channel message comprising the unique identifier for the first child page and a recording status;
   sending the channel message to the first child page;
   receiving a content message from the first child page, the content message comprising the unique identifier for the first child page and activity data comprising one or more actions performed by a user in the first child page, the activity data captured according to the recording status; and
   sending activity data comprising one or more actions performed by the user in the webpage and activity data comprising one or more actions performed by the user in the first child page to a server system to generate a session replay.

2. The computer-implemented method of claim 1, further comprising:
   receiving a message from a new child page requesting a unique identifier;
   sending the unique identifier to the new child page;
   receiving a content message from the new child page, the content message comprising the unique identifier for the new child page and activity data performed by the user in the new child page, the activity data captured according to the recording status; and
   wherein sending activity data performed by the user in the webpage and activity data performed by the user in the first child page to a server system to generate the session replay also comprises sending the activity data comprising one or more actions performed by the user in the new child page to the server system to generate the session replay.

3. The computer-implemented method of claim 1, wherein the content message further comprises a time stamp associated with the activity data.

4. The computer-implemented method of claim 3, wherein the server system generates the session replay by assembling the activity data performed by the user in the webpage and the first child page according to the time stamp associated with the activity data and causes one or more actions performed by the user on the webpage and first child page to be replayed on a computing device.

5. The computer-implemented method of claim 1, wherein the recording status includes enabling a recording with anonymization.

6. The computer-implemented method of claim 5, wherein the recording with anonymization obscures personal information associated with the user.

7. The computer-implemented method of claim 1, further comprising:
   sending a message to the first child page comprising an instruction to stop recording activity data upon detecting inactivity by the user and an instruction to start recording activity data upon detecting activity by the user.

8. The computer-implemented method of claim 1, wherein the received activity data comprising one or more actions performed by the user in the first child page comprises position data for a position of one or more actions performed by the user within the first child page and further comprising:
   transforming the position data to a position within the webpage instead of a position within the first child page.

9. The computer-implemented method of claim 8, wherein transforming the position data to a position within the webpage comprises transforming an x and y coordinate of a position of an action performed by a user within the first child page to a corresponding x and y position in the webpage based on a position of the first child page within the webpage.

10. The computer-implemented method of claim 1, wherein before generating and sending a channel message for the first child page, the method comprises:
    confirming that an origin of the response is one of predefined origins.

11. The computer-implemented method of claim 1, wherein the first child page is a child page of a second child page.

12. The computer-implemented method of claim 1, wherein the first child page is an iframe or WebView.

13. A computing device comprising:
    a processor; and
    a memory storing instructions that, when executed by the processor, configure the computing device to perform operations comprising:
    sending a unique identifier to each child page within a webpage;
    receiving a response from a first child page;
    generating a channel message for the first child page, the channel message comprising the unique identifier for the first child page and a recording status;
    sending the channel message to the first child page;
    receiving a content message from the first child page, the content message comprising the unique identifier for the first child page and activity data comprising one or more actions performed by a user in the first child page, the activity data captured according to the recording status; and
    sending activity data comprising one or more actions performed by the user in the webpage and activity data comprising one or more actions performed by the user in the first child page to a server system to generate a session replay.

14. The computing device of claim 13, the operations further comprising:
- receiving a message from a new child page requesting a unique identifier;
- sending the unique identifier to the new child page;
- receiving a content message from the new child page, the content message comprising the unique identifier for the new child page and activity data performed by the user in the new child page, the activity data captured according to the recording status; and
- wherein sending activity data performed by the user in the webpage and activity data performed by the user in the first child page to a server system to generate the session replay also comprises sending the activity data comprising one or more actions performed by the user in the new child page to the server system to generate the session replay.

15. The computing device of claim 13, wherein the content message further comprises a time stamp associated with the activity data.

16. The computing device of claim 15, wherein the server system generates the session replay by assembling the activity data performed by the user in the webpage and the first child page according to the time stamp associated with the activity data and causes one or more actions performed by the user on the webpage and first child page to be replayed on a computing device.

17. The computing device of claim 13, wherein the recording status includes enabling a recording with anonymization and wherein the recording with anonymization obscures personal information associated with the user.

18. The computing device of claim 13, wherein the received activity data comprising one or more actions performed by the user in the first child page comprises position data for a position of one or more actions performed by the user within the first child page, and the operations further comprise:
- transforming the position data to a position within the webpage instead of a position within the first child page.

19. The computing device of claim 18, wherein transforming the position data to a position within the webpage comprises transforming an x and y coordinate of a position of an action performed by a user within the first child page to a corresponding x and y position in the webpage based on a position of the first child page within the webpage.

20. A non-transitory computer-readable storage medium including instructions that, when processed by a computer, configure the computer to perform operations comprising:
- sending a unique identifier to each child page within a webpage;
- receiving a response from a first child page;
- generating a channel message for the first child page, the channel message comprising the unique identifier for the first child page and a recording status;
- sending the channel message to the first child page;
- receiving a content message from the first child page, the content message comprising the unique identifier for the first child page and activity data comprising one or more actions performed by a user in the first child page, the activity data captured according to the recording status; and
- sending activity data comprising one or more actions performed by the user in the webpage and activity data comprising one or more actions performed by the user in the first child page to a server system to generate a session replay.

* * * * *

UNITED STATES PATENT AND TRADEMARK OFFICE
CERTIFICATE OF CORRECTION

| | | |
|---|---|---|
| PATENT NO. | : 12,047,465 B1 | Page 1 of 1 |
| APPLICATION NO. | : 18/400398 | |
| DATED | : July 23, 2024 | |
| INVENTOR(S) | : Giovangrandi et al. | |

It is certified that error appears in the above-identified patent and that said Letters Patent is hereby corrected as shown below:

In the Specification

In Column 1, Line 12, delete "web sites" and insert --websites-- therefor

In Column 5, Line 45, delete "web site" and insert --website-- therefor

In Column 6, Line 9, delete "web site," and insert --website,-- therefor

In Column 12, Line 27, delete "I/O" and insert --(I/O)-- therefor

In Column 15, Line 53, delete "606" and insert --1106-- therefor

In the Claims

In Column 20, Line 3, in Claim 4, after "and", insert --the--

In Column 21, Line 26, in Claim 16, after "and", insert --the--

Signed and Sealed this
Twenty-fifth Day of March, 2025

Coke Morgan Stewart
*Acting Director of the United States Patent and Trademark Office*